Nov. 1, 1949     H. E. HERRINGTON     2,486,945
INTEREST FACTOR CALCULATOR
Filed Dec. 4, 1947     4 Sheets-Sheet 1
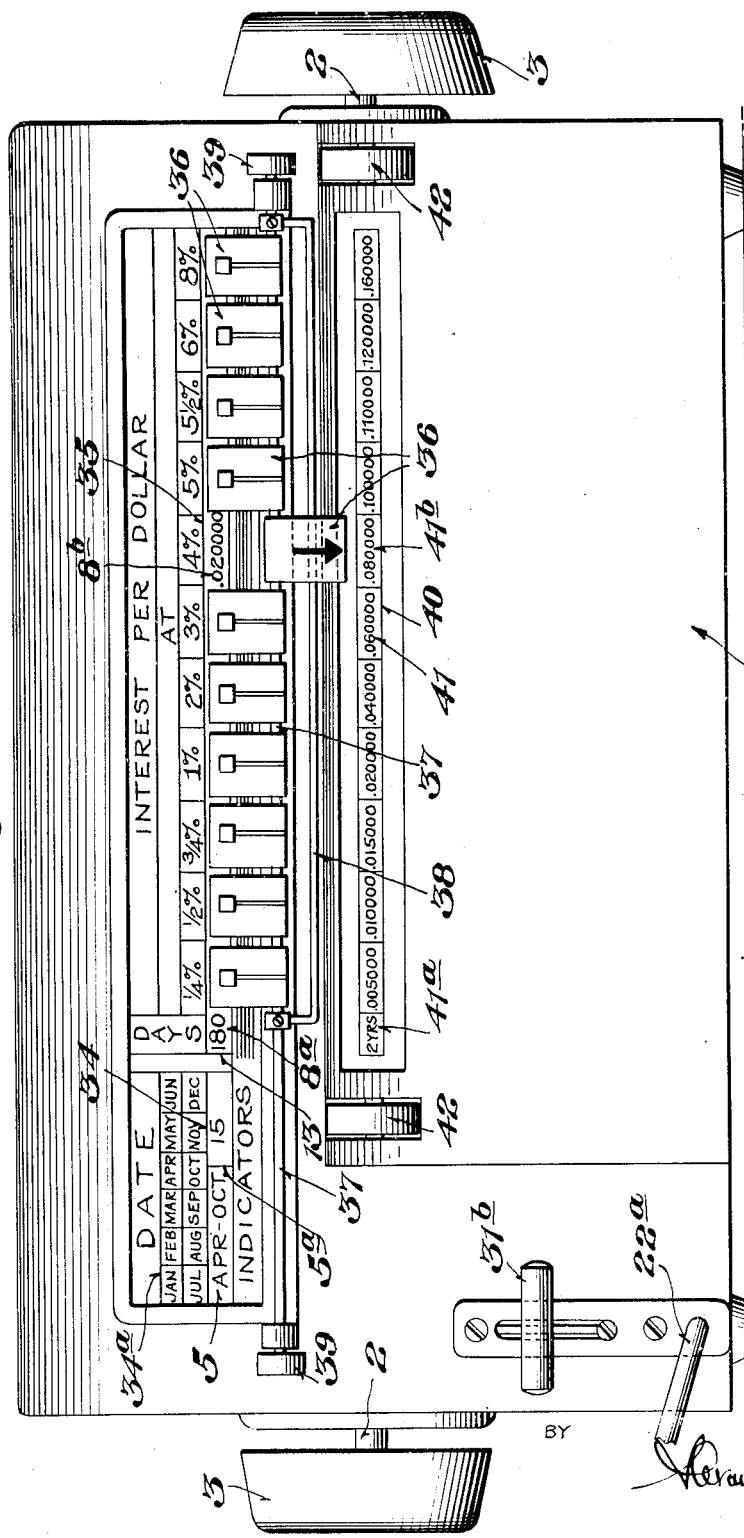

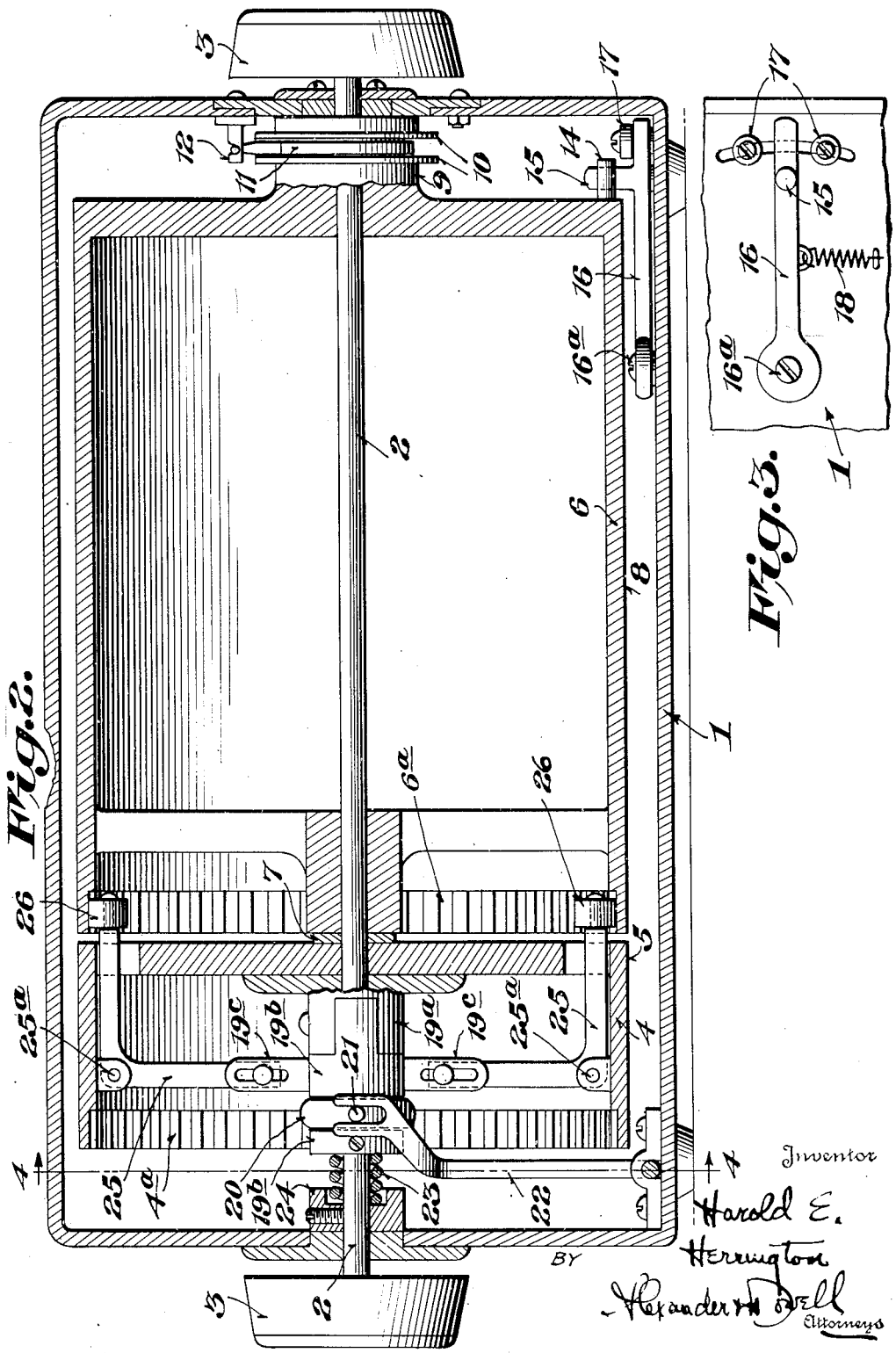

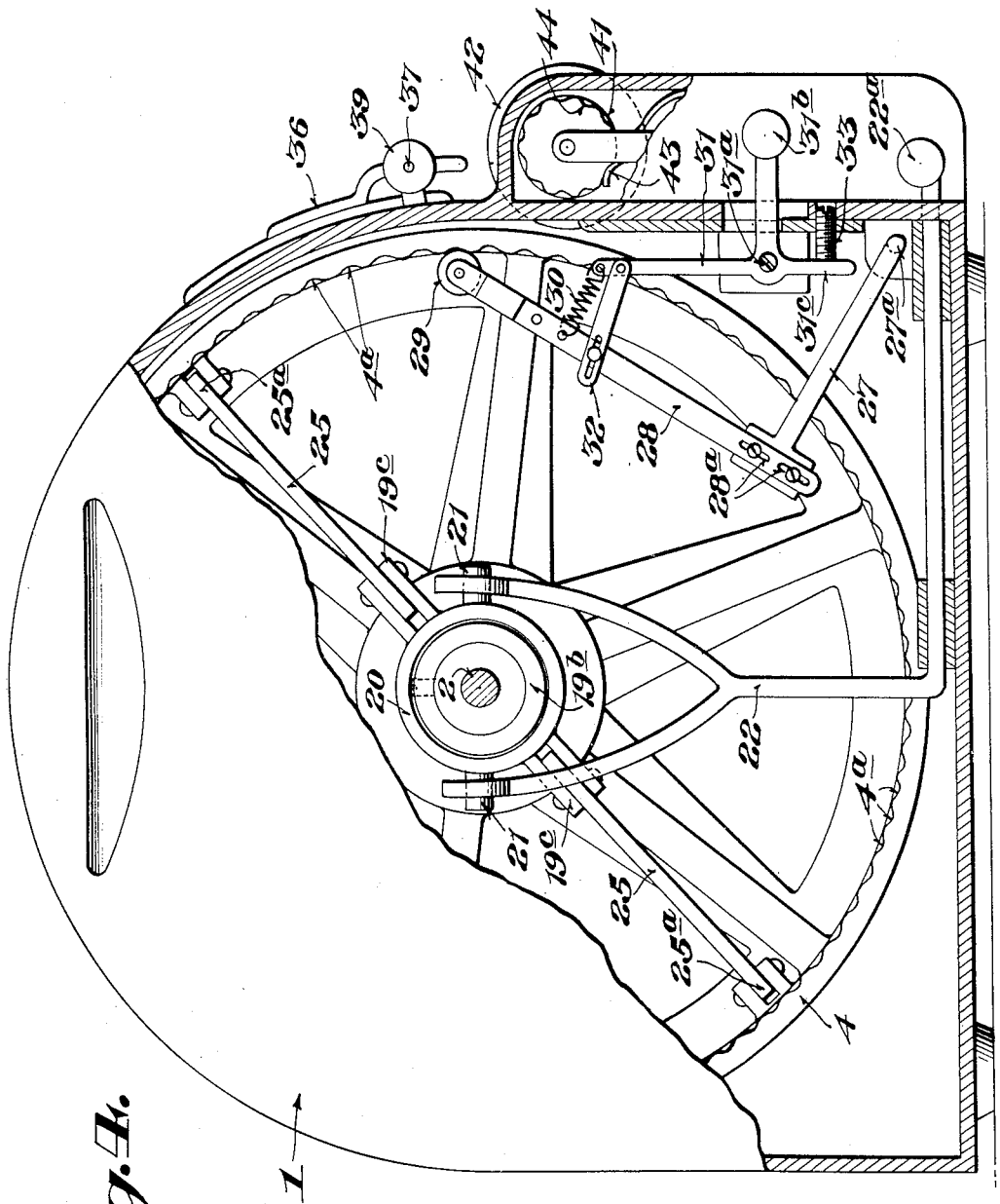

Nov. 1, 1949  H. E. HERRINGTON  2,486,945
INTEREST FACTOR CALCULATOR
Filed Dec. 4, 1947  4 Sheets-Sheet 4

Fig. 5.

| DATE | | DAYS | INTEREST PER DOLLAR @ 4% |
|---|---|---|---|
| JAN-JUL | 1 | 176 | .019556 |
| JAN-JUL | 2 | 177 | .019667 |
| JAN-JUL | 3 | 178 | .019778 |
| JAN-JUL | 4 | 179 | .019889 |
| JAN-JUL | 5 | 180 | .020000 |
| JAN-JUL | 6 | 1 | .000111 |
| JAN-JUL | 7 | 2 | .000222 |
| JAN-JUL | 8 | 3 | .000333 |
| JAN-JUL | 9 | 4 | .000444 |
| JAN-JUL | 10 | 5 | .000556 |
| JAN-JUL | 11 | 6 | .000667 |
| JAN-JUL | 12 | 7 | .000778 |
| JAN-JUL | 13 | 8 | .000889 |
| JAN-JUL | 14 | 9 | .001000 |
| JAN-JUL | 15 | 10 | .001111 |
| JAN-JUL | 16 | 11 | .001222 |
| JAN-JUL | 17 | 12 | .001333 |
| JAN-JUL | 18 | 13 | .001444 |
| JAN-JUL | 19 | 14 | .001556 |
| JAN-JUL | 20 | 15 | .001667 |
| JAN-JUL | 21 | 16 | .001778 |
| JAN-JUL | 22 | 17 | .001889 |
| JAN-JUL | 23 | 18 | .002000 |
| JAN-JUL | 24 | 19 | .002111 |
| JAN-JUL | 25 | 20 | .002222 |
| JAN-JUL | 26 | 21 | .002333 |
| JAN-JUL | 27 | 22 | .002444 |
| JAN-JUL | 28 | 23 | .002556 |
| JAN-JUL | 29 | 24 | .002667 |
| JAN-JUL | 30 | 25 | .002778 |
| FEB-AUG | 1 | 26 | .002889 |
| FEB-AUG | 2 | 27 | .003000 |
| FEB-AUG | 3 | 28 | .003111 |
| FEB-AUG | 4 | 29 | .003222 |
| FEB-AUG | 5 | 30 | .003333 |
| FEB-AUG | 6 | 31 | .003444 |
| FEB-AUG | 7 | 32 | .003556 |
| FEB-AUG | 8 | 33 | .003667 |
| FEB-AUG | 9 | 34 | .003778 |
| FEB-AUG | 10 | 35 | .003889 |
| FEB-AUG | 11 | 36 | .004000 |
| FEB-AUG | 12 | 37 | .004111 |
| FEB-AUG | 13 | 38 | .004222 |
| FEB-AUG | 14 | 39 | .004333 |
| FEB-AUG | 15 | 40 | .004444 |
| FEB-AUG | 16 | 41 | .004556 |
| MAY-NOV | 1 | 116 | .012889 |
| JUN-DEC | 1 | 146 | .016222 |
| JUN-DEC | 29 | 174 | .019333 |
| JUN-DEC | 30 | 175 | .019444 |

Inventor
Harold E. Herrington
By
Attorneys

Patented Nov. 1, 1949

2,486,945

UNITED STATES PATENT OFFICE 2,486,945

INTEREST FACTOR CALCULATOR

Harold E. Herrington, Wichita, Kans.

Application December 4, 1947, Serial No. 789,627

18 Claims. (Cl. 235—87)

1

My invention is a novel interest factor calculator of the type wherein interest factors for various rates of interest and lengths of time may be rolled into position for viewing through windows, the figures and dates being carried on the outer surfaces of cylindrical drums.

The primary object of my invention is the provision of an interest factor calculator based upon the recognized thirty-day month, capable of instantly calculating the interest factor on one dollar for a plurality of interest rates and various periods of time.

Another object of my invention is to provide a calculator simple enough in design and operation as to make operation thereof efficient and foolproof.

Still another object is the provision of a device which will give a direct reading of the number of days elapsed in the time interval between the dates being considered, the number of days elapsed being calculated simultaneously with the calculation of the interest factor.

A further object of this invention is the provision of a calculator which is economical to manufacture and in which the size of the device is reduced to a minimum by having the indicia on the drums cover only half a year's time, longer intervals of time being calculated by the use of multiplier scales.

Other objects of my invention will become apparent in the description of the accompanying drawings, wherein:

Figure 1 is a front elevation of my calculator as it appears in operation.

Fig. 2 is a sectional front view with the outside cover and the front half of the drums cut away to show the internal construction of the device.

Fig. 3 is a top view of the shock-absorbing, zero-stop mechanism.

Fig. 4 is a section view through lines 4—4 in Fig. 2.

Fig. 5 is a developed view of the indicia charts on the cylindrical drums showing an example of the indicia for only one interest rate.

Considering Figs. 1 and 2, a practical embodiment of my invention comprises a housing 1 with a continuous shaft 2 extending through the housing and journalled therein at each end, knobs 3 being secured at the outer ends for adjustment purposes. A drum 4 carrying on its outer surface the days and months indicia strip 5, Fig. 5, is fixed, as by a pin or set screw on shaft 2; and another drum 6 is journalled on shaft 2 adjacent drum 4 and separated therefrom by washer 7. Drum 6 is free to rotate on the shaft and car-

2 ries on its outer surface a strip 8 bearing indicia indicating the number-of-days-elapsed 8a, and the interest-per-dollar factor 8b (Fig. 5).

Around the outer bearing hub 9 of drum 6, Fig. 2, and between guides 10 is a spiral spring 11 secured at its inner end to the drum hub 9 and at its outer end to a lug 12 on casing 1. Spring 11 yieldably urges drum 6 to a "zero position" whereat the number-of-days-elapsed indicia 8a reads "180" through the window 13 on the front of casing 1. Below the hub 9 on drum 6 is a projecting pin 14 engaging a lug 15, Fig. 3, projecting upward from the shock-absorbing zero-stop arm 16 pivoted at 16a and limited in travel at its opposite end by adjustable stops 17. The arm 16 and attached lug 15 cooperate with pin 14 resiliently urging the drum 6 to "zero position" by action of tension spring 18 and limiting the travel of drum 6 to one revolution.

Between drums 4 and 6 is a locking mechanism for joining said drums together in locked relation to align their respective indicia as required by the circumstances of the particular interest problem being calculated. This locking mechanism comprising coupling members 19a and 19b, coupling member 19a being fixed on shaft 2 for unitary rotation with drum 4, and coupling member 19b being free to slide axially on shaft 2 though the tongue on member 19b is always in engagement with the groove in member 19a. A ring 20 carrying projecting pins 21 is free to rotate in an annular recess on member 19b, and a bifurcated lever 22, engaging pins 21, urges member 19b away from hub 19a when handle 22a on the front panel is depressed against the action of spring 23. A collar 24, fixed to shaft 2, provides a footing for spring 23 and prevents axial shifting to the left (Fig. 2) of the shaft 2 in its journals. Two L-shaped levers 25 pivoted at 25a to pivots inside drum 4 are connected to lugs 19c on coupling member 19b so that movement of coupling 19b to the left (Fig. 2) produces inward movement of rollers 26, thus disengaging rollers 26 from detent corrugations 6a on drum 6 to allow relative rotation between drums 4 and 6.

When drums 4 and 6 are locked together, that is, when rollers 26 are in tight engagement with detents 6a, spring 11 urges both drums into the "zero position" in which pin 14 contacts stop 15. When the calculator is in use spring 11 is always urging the drums away from the position where they are set. Therefore, a brake mechanism, Fig. 4, is provided wherein a rod 27 is pivoted at 27a and at its other end supports a brake arm 28.

A roller 29 engages corrugations 4a around the inner periphery of drum 4, the roller being resiliently pressed against corrugations 4a by spring 30, one end of which is attached to brake arm 28 and the other end to T-shaped control lever 31 pivoted at 31a. Outward movement of the spring-engaging leg of arm 31 is effected by the depression of handle 31b, this movement tightening the spring 30 and increasing the drag of roller 29 on corrugations 4a. Positive locking of the brake will occur when the handle 31b is depressed far enough so that slotted link 32 forces the arm 28 outwardly and locks roller 29 on the corrugations 4a. The minimum tension on the spring 30 is set by adjusting screw 33 against the lower end 31c of arm 31, thereby providing a certain minimum amount of drag by the brake to slow up the drums to a step by step movement when said drums are returning to "zero position" when suddenly released from a setting.

A slotted adjustment 28a is provided on arm 28 so that the roller 29 may be raised or lowered with respect to the casing 1 to center the indicia in the windows when the drums are locked by the brake.

Referring to Fig. 5 showing the indicia strips 5 and 8 carried by drums 4 and 6, respectively, the indicia on these charts represent a six-months period, thirty days per month, so that on date strip 5 the names of two months appear next to each date figure. On indicia strip 8 on the left is a column 8a of numbers from 1 to 180 representing the number of days elapsed for a six-month period, and on the right are a plurality of columns 8b, each column showing for a different interest rate the interest due on one dollar for the elapsed number of days in the corresponding row in column 8a. As many columns 8b may be provided as desired to give direct readings at different per cent rates of interest. On strip 5 is a diagonal line 5a preferably colored red to be used to determine the approximate location of drum 4 while rotating too fast to read the indicia. As the drum rotates the line moves across window 34, Fig. 1, below the names of the months at 34a to give an indication of which month's name is appearing in window 34 as at 5.

In Fig. 1, the interest factors 8b register with windows 35 behind covers 36, one window and cover being provided for each rate of interest column 8b on strip 8. The percentage interest rate is indicated by lettering above each window 35 and the operator in calculating a problem lowers the window corresponding to the desired rate of interest to read the interest factor indicia 8b. Covers 36 are pivoted on shaft 37, said shaft carrying an offset rod 38 and knurled knobs 39 cooperating to raise covers 36 to the closed position when rod 38 is rotated upward about shaft 37 by the turning of knobs 39.

Below windows 35 is another set of windows 40 behind which is a drum 41 also carrying indicia. Drum 41 is rotated by knobs 42 and held in any registering position by spring finger 43 and detent corrugations 44. The first column of indicia on the left of drum 41 is a multiplier scale 41a in terms of one-half year periods. The indicia to the right of scale 41a show interest factors for one-half, one, one and one-half, two, two and one-half, three, three and one-half, four, four and one-half, five, five and one-half, and six years. For example, the calculator setting as shown in Fig. 1 is for six months or 180 days, window 13, indicia 8a. The four per cent cover has been lowered showing an interest factor for one dollar of .02000, window 35, for said 180 day period. If the operator desires this interest factor for two years instead of six months, he rotates drum 41 until "2 years" appears at 41a and then reads the desired interest factor, .08000, at 41b below the arrow on the four per cent cover. Thus interest factors may be multiplied in six months steps by the use of drum 41.

In each case the corrugations or detents at 4a, 6a, and 44 correspond to the respective rows of indicia on the drums and are designed to hold the indicia in register with their respective windows, these being 180 corrugations at 4a and 6a, and 12 corrugations at 44 in this particular embodiment.

*Operation*

The following procedure is followed in calculating an interest problem: Lever 22a is first depressed disengaging drum 6 from drum 4, spring 11 holding drum 6 in the zero position. Knob 3 is then turned until the initial date of the period of time involved appears in window 34. Lever 22a is then released and drums 4 and 6 thereby locked together. Indicia 8a in window 13 then reads "180." Knob 3 may then be rotated until the final date of the period of time involved appears in window 34, at which point indicia 8a, window 13, will read the number of days elapsed in the time interval involved. The drums are locked at that position to prevent spring 11 from returning them to the initial or zero position by depressing lever 31b, and one of the covers 36 below the desired per cent interest rate is lowered, and the correct interest factor indicia 8b is read through window 35.

If the elapsed time interval is greater than six months, for example, two years, three months, the interest factor is calculated for three months as described above and this factor is then added to the interest factor for two years as read in window 40, indicia 41b, with indicia 41a set at "2 years." All interest factors read in either window 35 or 40 are interest per dollar, and the total interest involved must be calculated by multiplying the interest factor by the principal involved either by hand or external calculating machine.

If it is desired to calculate an interest factor for a per cent interest rate not shown on the calculator, for example, 7½ per cent, two covers, for example, 2 per cent and 5½ per cent, may be lowered and the respective interest factors added together to form the sum of 7½ per cent.

I do not limit my invention to the exact form shown in the drawings for obviously changes may be made therein within the scope of the claims.

I claim:

1. An interest factor calculator, comprising a casing; a shaft journaled in said casing, means for rotating said shaft; a drum fixed on said shaft; a second drum journaled on said shaft; means for locking the drums together for unitary rotation; means for urging the second drum to a zero position with respect to the casing; means for resiliently stopping said drum at zero position and for limiting the rotation of the drum to one revolution; brake means for stopping the first drum in one of a plurality of predetermined positions; a window assembly on the front of said casing; and indicia on the surfaces of the drums adapted to register with said window assembly when the drums are stopped.

2. In a calculator as set forth in claim 1, said means for locking the drums together comprising a grooved coupling hub fixed on said fixed drum; a coupling sleeve axially slidable on the shaft carrying a tongue; the tongue being engaged in said groove; spring means urging said sleeve toward said hub; a ring within said sleeve; pins projecting radially from said ring; an arm engaging said pins to slide said sleeve against the spring means away from the hub; radially projecting lugs on said sleeve; radial slots in said lugs; L-shaped levers pivotally secured at their bends to the inner surface of said fixed drum, the inner end of each lever extending radially inwardly carrying means to slidably engage the related slot in said lug, and the outer leg of each lever extending normally parallel to the shaft toward the second drum; a set of continuous annular detent corrugations around the inner surface of the second drum; and rollers on the outer legs of the L-shaped levers adapted to engage said detent corrugations, said rollers being moved inwardly to disengage said detent corrugations when said sleeve is actuated away from said hub by said arm.

3. In a calculator as set forth in claim 1, said brake means comprising an annular set of corrugations within said fixed drum; a brake arm longitudinally slotted at one end; a roller mounted on the other end of said brake arm adapted to engage said corrugations; a rod pivoted to said casing at one end and disposed at substantially right angles to said brake arm, means for adjustably securing the other end of said rod to the slotted end of the brake arm; a control lever pivoted to the casing and having a leg intermediate its ends projecting through the casing horizontally, and the other two legs extending vertically from the pivot upwardly and downwardly respectively; a tension spring joining the upper leg of the control lever to the brake arm near said roller; a longitudinally slotted link mounted in parallel with said spring adapted to replace the resilient action of the spring with positive action when the control lever is pressed to the end of its travel; and an adjustment screw threaded in the casing with its inner end pressing on the lower leg of the control lever to adjust the minimum tension of the spring.

4. In a calculator as set forth in claim 1, said indicia comprising a strip applied to the outer surface of the fixed drum; a column on said strip of 180 dates covering a six-month period based on a thirty-day month, the names of two months respectively half a year apart appearing opposite each date number; a diagonal line extending across the surface of the strip from one corner thereof to the diagonally opposite corner, said line being of distinctive color or character; and a cooperating indicia strip on the outer surface of said second mentioned drum.

5. In a calculator as set forth in claim 4, said indicia strip on said second drum comprising a column of sequentially increasing numbers from 1 to 180 representing days of elapsed time and adapted to register with the 180 dates on the fixed drum; and a plurality of columns of interest factors based on interest per dollar arranged opposite the aforementioned sequential numbers, each column bearing interest factors for different per cent interest rates, said interest factors also sequentially increasing with the number of days elapsed time.

6. In a calculator as set forth in claim 5, said window assembly comprising a plate; longitudinal window slots in said plate, fixed indicia above said slots cooperating with the movable indicia on the drums, said fixed indicia including a table of months cooperating with said diagonal line on the date strip and per cent interest rate numbers indicating the interest rates represented by the respective columns of interest factor indicia; a shaft extending across the plate below said window slots and journalled in lugs on said plate; an offset rod fixed on said shaft extending parallel therewith; means for rotating the shaft and said rod thereabout; and a plurality of covers pivoted on said shaft adapted to overlie the interest factor window slots when in an upright position and to uncover said slots when pivoted downward, said covers having downwardly pointing arrows marked on their outer faces in the lowered position with the covers lying on said rod and adapted to be raised to the upright position by rotation of said rod and shaft by actuation of said rotating means.

7. An interest factor calculator comprising a casing; a shaft journalled in said casing; external means for rotating said shaft; a drum fixed on said shaft; a second drum journalled on said shaft adjacent the fixed drum; means for locking the drums together in register for unitary rotation; means for urging the second drum to a zero position with respect to the casing; means for resiliently stopping said drum at zero position and for limiting the rotation of the drum to one revolution; brake means for stopping the first drum in one of a plurality of predetermined positions; a window assembly on the front of said casing; indicia on the surfaces of the drums adapted to register with said window assembly when the drums are stopped in one of said predetermined positions; a multiplier drum rotatably mounted in the casing below said window assembly; means for rotating said multiplier drum; a window slot in said casing opposite said drum; indicia on the outer surface of said drum registering with said window slot; and detent means between said drum and said casing to hold the indicia in positive register with said window slot.

8. In a calculator as set forth in claim 7, said means for locking the drums together in register comprising a grooved coupling hub fixed on said fixed drum; a coupling sleeve axially slidable on the shaft carrying a tongue, the tongue being engaged in said groove to prevent relative rotation of the sleeve with respect to the hub; spring means urging said sleeve toward said hub; a ring within said sleeve; pins projecting radially from said ring; an arm engaging said pins to slide said sleeve against the spring means away from the hub; radially projecting lugs on said sleeve; radial slots in said lugs; L-shaped levers pivotally secured at their bends to the inner surface of said fixed drum, the inner lug of each lever extending radially inwardly carrying means to slidably engage the slots in said lugs, and the outer leg of each lever extending normally parallel to the shaft toward the second drum; a set of continuous annular detent corrugations around the inner surface of the second drum; and rollers on the outer legs of the L-shaped levers adapted to engage said detent corrugations, said rollers being moved inwardly to disengage said detent corrugations when said sleeve is actuated away from said hub by said arm.

9. In a calculator as set forth in claim 7, said means for resiliently stopping said drum at zero position and for limiting the rotation of the drums to one revolution comprising an arm pivotally mounted to the casing at one end, cushioned stops limiting the circumferential travel of the outer end of said arm, the stops being adjustable in position; spring means yieldably urging said arm toward one stop; an offset from the outer end of said arm; and means carried by said drum to engage said offset to stop the rotation of the drum in either direction.

10. In a calculator as set forth in claim 7, said means for urging the second drum to a zero position with respect to the casing comprising a hub on the outer end of said second drum; an annular groove in said hub; radially extending guides on each side of the groove; a lug extending over said groove from the casing; and a spiral spring in said groove between the guides, the inner end of said spring being fixed to the hub and the outer end being fixed to said lug.

11. In a calculator as set forth in claim 7, said brake means comprising an annular set of corrugations within said fixed drum; a brake arm longitudinally slotted at one end; a roller mounted on the other end of said brake arm adapted to engage said corrugations; a rod pivoted to said casing at one end and disposed at substantially right angles to said brake arm; means for adjustably securing the other end of said rod to the slotted end of the brake arm; a control lever pivoted to the casing and having a leg intermediate its ends projecting through the casing horizontally, and the other two legs extending vertically from the pivot upwardly and downwardly respectively; a tension spring joining the upper leg of the control lever to the brake arm near said roller; a longitudinally slotted link mounted in parallel with said spring adapted to replace the resilient action of the spring with positive action when the control lever is pressed to the end of its travel; and an adjustment screw threaded in the casing with its inner end pressing on the lower leg of the control lever to adjust the minimum tension of the spring.

12. In a calculator as set forth in claim 7, said indicia comprising a strip applied to the outer surface of the fixed drum; a column on said strip of 180 dates covering a six-month period based on a thirty-day month, the names of two months respectively half a year apart appearing opposite each date number; a diagonal line extending across the surface of the strip from one corner thereof to the diagonally opposite corner, said line being of distinctive color or character; and a cooperating indicia strip on the outer surface of said second mentioned drum.

13. In a calculator as set forth in claim 12, said indicia strip on said second drum comprising a column of sequentially increasing numbers from 1 to 180 representing days of elapsed time and adapted to register with the 180 dates on the fixed drum; and a plurality of columns of interest factors based on interest per dollar arranged opposite the aforementioned sequential numbers, each column bearing interest factors for different per cent interest rates, said interest factors also sequentially increasing with the number of days elapsed time.

14. In a calculator as set forth in claim 13, said window assembly comprising a plate; longitudinal window slots in said plate, fixed indicia above said slots cooperating with the movable indicia on the drums, said fixed indicia including a table of months cooperating with said diagonal line on the date strip and per cent interest rate numbers indicating the interest rates represented by the respective columns of interest factor indicia; a shaft extending across the plate below said window slots and journalled in lugs on said plate; an offset rod fixed on said shaft extending parallel therewith; means for rotating the shaft and said rod thereabout; and a plurality of covers pivoted on said shaft adapted to overlie the interest factor window slots when in an upright position and to uncover said slots when pivoted downwardly, said covers having downwardly pointing arrows marked on their outer faces in the lower position with the covers lying on said rod and adapted to be raised to the upright position by rotation of said rod and shaft by actuation of said rotating means.

15. In a calculator as set forth in claim 14, said indicia on the outer surface of the multiplier drum comprising in developed form a strip, a date column showing indicia increasing in one-half year steps; and a plurality of columns of interest factor indicia arranged in rows opposite the date column indicia, the number of columns of interest factor indicia being equal to the number of per cent interest window covers and being vertically aligned therewith and arranged below said covers so that said downwardly pointing arrows point to their related interest factor columns on said multiplier drum.

16. An interest factor calculator comprising a casing; a shaft journalled in said casing; a drum fixed on said shaft; a second drum journalled on said shaft; means for locking the drums together for unitary rotation; a window assembly on the front of said casing; and indicia on the surface of the drums, said indicia comprising a strip applied to the outer surface of the fixed drum; a column on said strip of 180 dates covering a six-month period based on a 30-day month, the names of two months respectively half a year apart appearing opposite each date number; a diagonal line extending across the surface of the strip from one corner thereof to the diagonally opposite corner, said line being of distinctive color or character; and a cooperating indicia strip on the outer surface of the second mentioned drum.

17. In a calculator as set forth in claim 16, said indicia strip on said second drum comprising a column of sequentially increasing numbers from 1 to 180 representing days of elapsed time and adapted to register with the 180 dates on the fixed drum; and a plurality of columns of interest factors based on interest per dollar arranged opposite the aforementioned sequential numbers, each column bearing interest factors for different per cent interest rates, said interest factors also sequentially increasing with the number of days elapsed time.

18. In a calculator as set forth in claim 17, said window assembly comprising a plate; longitudinal window slots in said plate, fixed indicia above said slots cooperating with the movable indicia on the drums, said fixed indicia including a table of months cooperating with said diagonal line on the date strip and per cent interest rate numbers indicating the interest rates represented by the respective columns of interest factor indicia; a shaft extending across the plate below said window slots and journalled in lugs on said plate; an offset rod fixed on said shaft extending parallel therewith; means for rotating the shaft and said rod thereabout; and a plurality of covers pivoted on said shaft adapted to overlie the interest factor window slots when in an upright position and to uncover said slots when pivoted downward, said covers having downwardly pointing arrows marked on their outer faces in the lowered position with the covers lying on said rod and adapted to be raised to the upright position by rotation of said rod and shaft by actuation of said rotating means.

HAROLD E. HERRINGTON.

REFERENCES CITED

The following references are of record in the file of this patent:

UNITED STATES PATENTS

| Number | Name | Date |
|---|---|---|
| 614,851 | Drake | Nov. 29, 1898 |
| 823,426 | Meilicke | June 12, 1906 |
| 909,621 | Lamb | Jan. 12, 1909 |
| 1,079,712 | Meilicke | Nov. 25, 1913 |
| 1,411,357 | Hornbostel | Apr. 4, 1922 |
| 1,503,076 | Tillman | July 29, 1924 |
| 1,771,614 | Bowman | July 29, 1930 |
| 2,358,479 | Sassen | Sept. 19, 1944 |